Nov. 9, 1937.  H. C. HAYES  2,098,240
NAVIGATION OF AIRCRAFT
Original Filed March 11, 1931
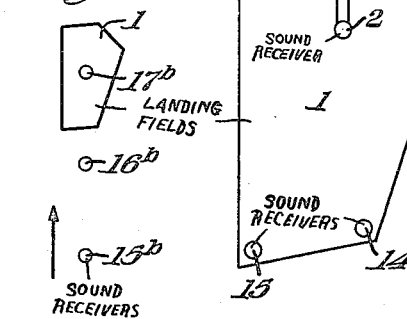
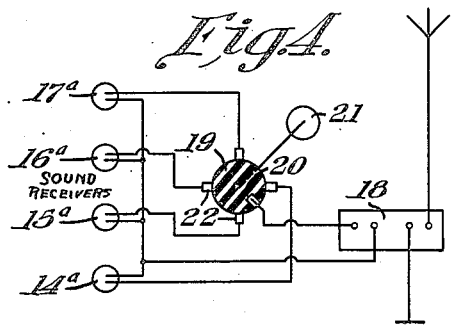
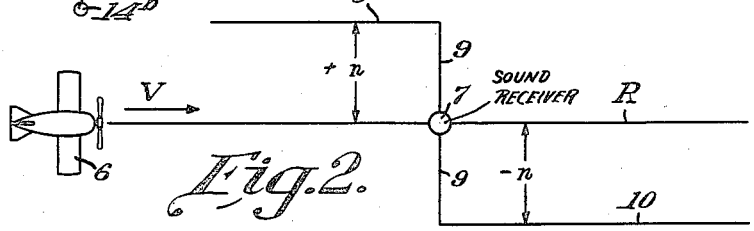
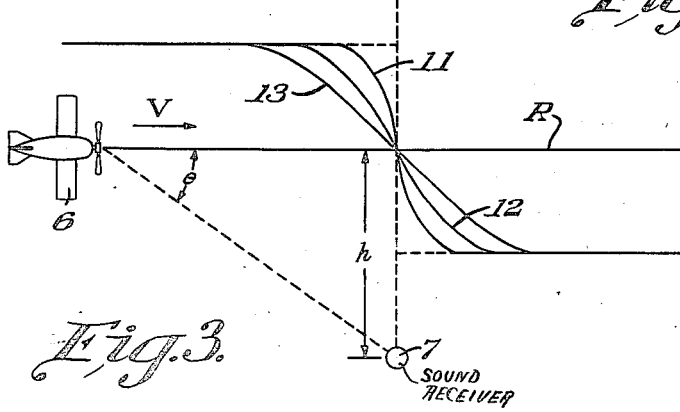
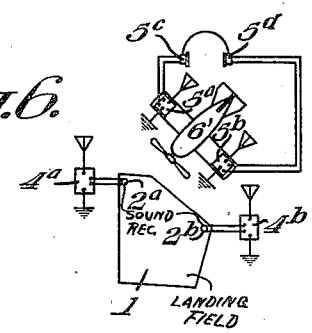
Harvey C. Hayes
INVENTOR
BY *John J. [signature]*
his ATTORNEY Patented Nov. 9, 1937

2,098,240

UNITED STATES PATENT OFFICE 2,098,240

NAVIGATION OF AIRCRAFT

Harvey C. Hayes, Washington, D. C.

Original application March 11, 1931, Serial No. 521,686. Divided and this application January 22, 1935, Serial No. 2,970

5 Claims. (Cl. 177—352)

(Granted under the act of March 3, 1883, as amended April 30, 1928; 370 O. G. 757)

This case is a division of my copending abandoned application covering Navigation of aircraft, Serial No. 521,686, filed March 11, 1931.

This invention relates to the navigation of aircraft and more particularly to certain applications of acoustics which have for their purpose the aiding and safeguarding of the navigation of aircraft, especially as regards the making of field landings under conditions of low visibility.

The various applications of acoustics for depth-finding and range-finding on ships are fairly well known and the use of similar methods and apparatus on aircraft has been repeatedly considered during the past few years, as has also been considered the application of more recent developments having to do with the velocity and course of ships relative to the sea-bottom which are not so generally known. During this time a study of the problem has led to certain conceptions involving various combinations of radio and acoustical apparatus which, judging from tests which have been carried out, promise to operate successfully on aircraft. These combinations all involve a radio receiver and sound generator on the aircraft and sound receiver and radio transmitter on the ground. The sound generated on the plane, which may be that which naturally arises from engine exhaust, propeller scream, vibrations in general or that generated by a special sound generating device such as a siren, is picked up by the sound receiver or receivers on the ground and transmitted back to the pilot by radio. This combination embodies several advantages, among them the following: It greatly lessens the disturbance of the numerous intense local sounds which penetrate to a considerable extent any known type of acoustical sound receiver that can be mounted on the aircraft. These disturbing sounds which are picked up because the sound receiver is near their source make it difficult for the listener to hear sound signals transmitted from the ground directly, and practically impossible for him to hear echoes of his own signals reflected from the ground. This arrangement therefore offers the great advantage of having the sound receiver located away from the intense local aircraft noises. This arrangement also permits the use of compound directive and tuned sound receivers, the weight and bulk of which prohibit their use on aircraft, and as will be seen, the problems to be solved appear to demand such receivers. This arrangement also reduces the weight and bulk of apparatus required on the aircraft to a minimum and makes it of such a nature that the radio operator can readily understand it and care for it.

In the drawing Fig. 1 illustrates one application of my invention; Figs. 2 and 3 are diagrams showing the movement of an airplane with respect to the ground; while Figs. 4, 5 and 6 show modified forms of my invention.

Fig. 1 shows the simplest application of this arrangement wherein the enclosed area 1 may represent the landing field having installed near its center a sound receiver 2 connected by electrical leads 3 to a cooperating radio transmitter 4, the output of which is picked up by the radio receiver 5 located on the aircraft 6. With this arrangement the operator cruises about the field and listens to the noise of his own plane as though he were standing near the receiver on the field. By noting the change of intensity or pitch of his craft's sounds he can determine with considerable accuracy when it passes above the receiver.

Another arrangement provides the aircraft with a sound transmitter (not shown) capable of sending out a strong sound signal of a fairly definite pitch because this permits the operator to judge more definitely and accurately the Doppler effect produced by the relative velocity and change in the relative velocity between the plane and the sound receiver as the plane passes across the field. Judging from tests which have been made, the Doppler effect offers a better solution of the problem of determining the instant when a straight line passing through a sound transmitter and receiver, one of which is fixed in position and the other moving, intersects at right angles the course of the moving transmitter or receiver as the case may be. The use of the Doppler effect for this purpose may be understood in connection with Figs. 2 and 3, wherein the course of an airplane is shown as directed from left to right along a straight line (R) at constant velocity (V). The location of the sound receiver is indicated by numeral 7 in each figure. In Fig. 2 the plane's course is shown as passing through the receiver for simplicity of description, and in Fig. 3 the plane's course is a distance ($h$) from the receiver, ($h$) being the perpendicular distance from the receiver to the course line. Now assume the plane is generating a sound of pitch (N). The receiver (Fig. 2) will pick up a pitch higher than (N) by some amount, say ($n$) which amount will actually be equal to the velocity of the plane (V) divided by the wave-length of the generated sound of pitch (N). This wave-length ($\lambda$) will equal the velocity of sound in the air (v) divided by the pitch (N) and we therefore have the relations:—

$$\lambda = \frac{V}{N}$$

$$n = \frac{V}{\lambda}$$

$$n = \frac{V.N}{v}$$

Thus the Doppler effect, which is the difference between the frequency heard at the receiver and the actual frequency generated is given as a definite value equal to the velocity of the plane (V) multiplied by the pitch (N) of the sound transmitted by the plane, and this product divided by the velocity of sound in air. This latter value is about fixed but both factors of the numerator are somewhat flexible and their product determines the value of (n), the change of which is made use of in determining when the plane passes the receiver 7. It is obvious that as the plane passes the receiver the pitch of the sound striking the receiver (7) will be lowered an amount (n). In Fig. 2 the broken line (8—9—9—10) shows the nature of the pitch of the sound picked up by the receiver as the plane makes its transit if we interpret the vertical distance of this line from the flight line to represent the value of (n), the amount that the pitch received by the pick-up 7 differs from the pitch (N) of the signal transmitted by the plane. It is to be noted that as the plane passes through the receiver the pitch picked up drops instantly from (N+n) to (N−n) and that, conversely, the operator could tell when the plane passed the receiver by noting this change of pitch.

Fig. 3 refers to the general case where the flight line passes the receiver 7 at a distance (h). Here the Doppler effect at the receiver is not due to the whole velocity (V) of the plane along its course, but to the component of this velocity along the line joining the plane and the receiver, and as a result it is not constant. At any instant it is numerically given by the relation:

$$n = \frac{N.V.\cos\theta}{v}$$

and it is therefore obvious that the value of (n) which decreases as (θ) is made larger becomes less as (h) is increased. Fig. 2, (h) was made equal to zero and then the pitch changed abruptly from (N+n) to (N−n), but in the general case the change of pitch is not abrupt when the plane passes the receiver. But it can be shown theoretically that the rate of change of pitch is most rapid in all cases at the instant when (θ) is 90 degrees, or in other words, when the plane is passing through the foot of the line drawn through the receiver 7 perpendicular to the flight course. The change of pitch is sufficiently rapid to be definitely noted even when the value of (h) is large, i. e., when the plane is a considerable distance from the receiver. The actual value of (n) as the plane traverses its course is given by the curved lines 11, 12 and 13, all of which pass through the foot of the perpendicular from 7 to the flight course. These three curves represent in each case a different but definite value of (h) and the slope of each curve at the origin gives the rate the value of (n) is changing as the plane passes this point. Curve 13, which represents the least slope, refers to a large value of (h), curve 12, to a smaller value and curve 11, to the smallest value.

In practice the actual slope of these curves is not determined but the operator has no difficulty in deciding whether the slope is steep or gradual by noting the abruptness of the change of pitch and a reasonable amount of practice should enable him to judge somewhat definitely the value of (h). Of course, the slope of these curves is dependent upon the velocity of the plane (V) as well as upon (h), but this should not offer any serious handicap because the pilot can hold his speed fairly constant while reconnoitering the landing field so that the variations in the abruptness of pitch change as the field is crossed may be interpreted as due to change in (h) and thus enable him to judge whether the approaches are coming nearer or further from the center of the field.

The combination of acoustical and radio apparatus described gives the pilot the same information that he would gain if he stood on the field at the location of the receiver and heard his plane cruising about, and in the meantime was deprived of his binaural sense of direction. He could judge by variation of intensity and pitch of the plane's sounds whether it passed near or far away and when it passed perpendicularly across the line of sound transit. However, he could not tell the plane's course or on which side it passed, since such information must result from his sense of direction. My apparatus gives this information because the receiver is located away from the intense local noises of his craft and the desired sound is brought to his ears by radio, which does not respond to the local sound waves.

While such information would be of value to the pilot and indeed might well be vital, it is evident that he could locate the field and decide upon a definite landing program much better if he were not deprived of his sense of direction, which would tell him whether he crossed the field to the right or left of the sound pick-up location. He already knows the direction of his course from his compass bearing. As illustrated in Fig. 6 wherein an aircraft 6' is shown approaching a landing field 1, by employing two sound receivers 2a, 2b or two symmetrical groups of such receivers and two separate radio transmitters 4a, 4b, one associated with one group of sound receivers and the other with the other group, each transmitter employing a carrier wave differing in frequency from the other, and by supplying the aircraft with two separate radio receiving systems 5a, 5b, one tuned to one transmitter and one to the other, with the output from one receiver connected through one phone 5c of a head set and the other through the other phone 5d, a combination of sound and radio apparatus would be formed which would permit the operator to employ his binaural sense of direction to determine the direction of his craft with respect to the line joining the two adjacent field receivers.

A somewhat simpler arrangement using tuned sound receivers located at definite known points about the field as shown by numerals 14, 15, 16 and 17 of Fig. 1 can serve the pilot to determine where he approaches and crosses the field. Suppose each of these sound receivers be tuned to respond to a definite but different frequency. Since the general noise from the aircraft covers a wide range of frequencies of fairly uniform intensity, each receiver will respond to its own frequency component of the ship's noise with about the same intensity if they are equidistant from the craft. Each receiver may have a separate associated transmitter, but it is preferred to make the pick-up of the several receivers the input to a single transmitter either in combination or by means of a rotating commutator switch, separately and in orderly succession, as is illustrated in Fig. 4.

In Fig. 4 the sound receivers 14a, 15a, 16a and 17a correspond to the sound receivers 14, 15, 16 and 17 of Fig. 1, and the output of each of these sound receivers passes to a common radio transmitter 18 at equally spaced intervals of time. In order that the sound receivers 14a—17a may be connected separately and serially to the radio transmitter 18, I have shown diagrammatically a commutating arrangement in which a disc 19 of insulating material, but having a metallic portion 20, is rotated at a constant speed by means of a suitable motor 21. A plurality of stationary brushes 22 are provided, each of these brushes being connected to one of the sound receivers 14a—17a, while the metallic portion 20 of the commutator disc 19 is connected to the radio transmitter 18. It will thus be observed that as the disc 19 rotates each of the sound receivers 14a—17a will be connected in turn to the transmitter 18. By means of the radio receiver in the plane, the operator will hear the differently pitched sounds picked up by the several tuned ground receivers and by judging their order of pick-up as the field is approached and their relative intensity as the field is passed, he can determine what part of the field he approaches and crosses. If the pilot is to judge the relative intensity of the different pitched notes by ear, it is preferred to use this commutator arrangement whereby he hears the tones following one another in orderly succession. It is, however, also possible to determine the relative intensities by the relative amplitude of vibration of reeds (not shown), one tuned respectively to each field receiver and all driven by the current output from the radio receiver, whereby each will respond to the intensity of that component of the current having to do with the pick-up of the field receiver of like tuning. It is to be understood that the particular type or form of reed indicator does not form a part of my invention since several well-known forms may be used. The publication of the United States Bureau of Standards entitled "Design of Tuned Reed Course Indicators for Aircraft Radiobeacon" by F. W. Dunmore, Research Paper No. 28, reprinted from Bureau of Standards Journal of Research, November, 1928, shows and describes certain forms of such indicators which might be used.

It is obvious that the disposition of receivers about the field can be varied in many ways. for example, a line of receivers extending out from the field as shown in Fig. 5 can be used to direct a plane to the field and to inform the pilot when the field is reached by varying the tuning pitch of the successive sound receivers 14b, 15b, 16b and 17b upward or downward toward the field with a distinct break in the pitch when the field is reached. In other words each of the receivers 14b, 15b, 16b and 17b is tuned to respond to a predetermined frequency of the sound generated by the plane and the arrangement is such that the frequencies of the several receivers will vary progressively upward or downward toward the field. The receiver 17b which may, as shown, be mounted substantially at the center of the field will respond to a frequency distinctly different from that of the other receivers. Thus, if a plane is approaching the field in the direction of the arrow of Fig. 5, the operator will first hear a sound having, for instance, a low frequency, this sound being emitted from the receiver-transmitter 14b. Shortly thereafter he will hear the sound from the station 15b which will have a higher frequency than that of 14b. Continuing, he will hear a sound of still higher frequency from station 16b and then as he nears the field I he will again hear a sound of low frequency which will indicate to him that he is hearing the sound broadcast from the receiver-transmitter 17b. It is to be understood that, as has been explained in reference to the system shown in Figure 1, each of the receivers 14b, 15b, 16b and 17b may be connected to an individual radio transmitter or the output of all of the receivers may be connected to the same transmitter. Such a line of single receivers can be followed by means of the intensity or pitch variation as each receiver is passed or if the receivers are mounted in pairs, as explained hereinbefore and illustrated in Fig. 6, the pilot can use his binaural sense to direct his craft from one receiver to the next.

It will be seen that I have provided combinations of sound and radio devices that are capable of supplying the pilot with valuable information to assist him in making an approach and a safe descent on a landing field, and that he is able to get such information for the reason that the arrangements permit of locating the sound receivers away from the intense local sounds of the aircraft which would otherwise be picked up to give so strong a background of noise that other sounds could only be heard with difficulty, if at all.

While I have described my invention in connection with preferred forms and combinations, it will be understood that I do not thereby intend to restrict myself to such illustrative means, as I intend to include in my invention all possible modifications and variations which fall within the scope of the appended claims.

The invention described herein may be manufactured and used by or for the Government of the United States of America for governmental purposes without the payment of any royalties thereon or therefor.

I claim:

1. In combination, a plurality of sound pick-up devices located at definite points on or about a landing field, each of said pick-up devices being tuned so as to respond to a definite and different frequency component of the sound generated by an aircraft, a radio transmitter for broadcasting the pick-up of said pick-up devices, and radio receiving means on said aircraft for receiving from said radio transmitter the sounds picked up by said pick-up devices so that the pilot may determine the position of his craft with respect to said landing field.

2. In combination, a plurality of sound pick-up devices located at definite points on or about a landing field, each of said pick-up devices being tuned so as to respond to a definite and different frequency component of the sound generated by an aircraft, a radio transmitter, connections between said transmitter and said pick-up devices, switch means in said connections adapted to connect said pick-up devices separately and serially to said radio transmitter, and radio receiving means on said aircraft for receiving from said radio transmitter the sounds picked up by each of said pick-up devices so that the pilot may determine the position of his craft as it approaches or recedes from said landing field.

3. In combination, a plurality of sound receivers located at definite points on or about a landing field, each of said receivers being tuned so as to respond to a definite and different frequency component of the sound generated by an aircraft, a radio transmitter, connections between said transmitter and receivers, a commutating device in said connections adapted to connect said receivers to said radio transmitter in orderly succession, and radio receiving means on said aircraft tuned to said radio transmitter so that the pilot may determine the position of his craft by noting the order of pick-up by the receivers as the field is approached and the relative intensity of the differently pitched notes as the field is passed.

4. In combination, a series of sound pick-up devices located along a line radiating from a landing field, the resonant frequency of said pick-up devices being such that each device in said series responds to a definite and different frequency component of the sound generated by an aircraft, a radio transmitter for broadcasting the pick-up of said pick-up devices and a radio receiver on said aircraft and tuned to said radio transmitter, the several pick-up devices being so arranged along the line radiating from the landing field as to enable the aircraft pilot to pick up progressively varying frequencies leading to or from the landing field and so direct his craft to said landing field.

5. In combination, a series of sound receivers located along a line radiating from a point in a landing field, the resonant frequency of said receivers being such that each receiver in said series responds to a definite and different frequency component of the sound generated by an aircraft, and the arrangement of said receivers along said line being such that they vary in frequency response in uninterrupted sequence toward said point in the landing field with the exception of the receiver nearest said point, which receiver is responsive to a frequency such as to break the orderly sequence of frequencies, a radio transmitter for broadcasting the sound picked up by said receivers and a radio receiver on said aircraft and tuned to said radio transmitter, whereby the pilot is enabled to hear the sound of his craft as picked up by said receivers as the aircraft passes and so direct his craft to said landing field.

HARVEY C. HAYES.